US010323969B2

(12) United States Patent
Geller et al.

(10) Patent No.: US 10,323,969 B2
(45) Date of Patent: Jun. 18, 2019

(54) FLUID SIGNALING DEVICE (71) Applicants: Scott F Geller, Berkeley, CA (US); Robert L. Hunsinger, III, Brentwood, CA (US)

(72) Inventors: Scott F Geller, Berkeley, CA (US); Robert L. Hunsinger, III, Brentwood, CA (US)

( * ) Notice: Subject to any disclaimer, the term of this patent is extended or adjusted under 35 U.S.C. 154(b) by 0 days.

(21) Appl. No.: 15/238,212

(22) Filed: Aug. 16, 2016

(65) Prior Publication Data
US 2018/0364087 A1 Dec. 20, 2018

Related U.S. Application Data (60) Provisional application No. 62/206,199, filed on Aug. 17, 2015.

(51) Int. Cl.
G01F 15/06 (2006.01)
E03C 1/04 (2006.01)
H01H 35/24 (2006.01)
E03C 1/08 (2006.01)

(52) U.S. Cl.
CPC .......... *G01F 15/068* (2013.01); *E03C 1/0404* (2013.01); *G01F 15/063* (2013.01); *H01H 35/24* (2013.01); *E03C 1/08* (2013.01)

(58) Field of Classification Search
CPC .......... G01F 15/068; F16K 31/02; E03C 1/18; E03C 1/04; B60L 3/006; F41H 7/00
See application file for complete search history.

(56) References Cited

U.S. PATENT DOCUMENTS

| 4,743,120 | A | * | 5/1988 | Bowen | G01K 13/02 374/147 |
| 5,062,164 | A | * | 11/1991 | Lee | E03C 1/057 137/613 |
| 5,625,155 | A | * | 4/1997 | Yoshida | G01F 1/002 73/861.11 |
| 5,821,399 | A | * | 10/1998 | Zelin | G01N 27/3271 73/1.02 |
| 5,979,500 | A | * | 11/1999 | Jahrling | E03C 1/057 137/624.12 |
| 6,082,407 | A | * | 7/2000 | Paterson | E03C 1/04 137/801 |
| 6,641,305 | B2 | | 11/2003 | Wang | |
| 6,782,736 | B1 | * | 8/2004 | Hammer | G01F 23/26 73/304 C |

(Continued)

OTHER PUBLICATIONS

Waterpebble. https://www.amazon.com/dp/B00OTWBZEK?psc=1.

*Primary Examiner* — Jewel V Dowtin (57) ABSTRACT

A fluid sensing device, including a housing; a fluid flow sensor at least partially contained within the housing and adapted to detect a flow of fluid through the housing; a timer operably connected to the fluid flow sensor and at least partially contained within the housing, the timer receiving a start signal from the fluid flow sensor when the fluid flow sensor detects the onset of fluid flow, the timer receiving a stop and reset signal from the fluid flow sensor when the fluid flow sensor detects the end of fluid flow; and at least one signaling device operably connected to the timer such that the signaling device is actuated when the timer indicates that a predetermined amount of time has elapsed.

28 Claims, 10 Drawing Sheets (56) References Cited

U.S. PATENT DOCUMENTS

| | | | | |
|---|---|---|---|---|
| 7,818,830 B2 * | 10/2010 | Thorne | E03C 1/0404 | 4/661 |
| 7,819,136 B1 * | 10/2010 | Eddy | E03C 1/057 | 137/552.7 |
| 7,946,184 B2 * | 5/2011 | Budmiger | G01F 1/58 | 73/861.12 |
| 7,979,928 B2 * | 7/2011 | Allen, Jr. | E03C 1/057 | 4/623 |
| 8,260,319 B2 * | 9/2012 | Wenger | G01S 5/0289 | 340/539.1 |
| 8,316,883 B1 * | 11/2012 | Watson | E03C 1/0404 | 137/315.12 |
| 8,978,450 B2 * | 3/2015 | Steinhauser | G01N 27/123 | 73/61.76 |
| 8,997,271 B2 * | 4/2015 | Bayley | A47K 10/48 | 4/638 |
| 9,335,297 B1 | 5/2016 | Cummins et al. | | |
| 10,042,367 B2 * | 8/2018 | McCarrick | G05D 7/0635 | |

* cited by examiner

FLUID SIGNALING DEVICE

FIELD OF INVENTION

The present invention relates to water conservation devices.

BACKGROUND OF THE INVENTION

The present invention is related to detecting and indicating the presence of a fluid (commonly water) emanating from, typically indoor, household plumbing fixtures. Water flow causes the integrated circuit (IC) containing printed circuit board (PCB) to sequentially activate one or more LEDs. The LED or LEDs serve as indicator(s) of the duration of time for which water has been flowing through (and generally, out of) the plumbing fixture. Through a progression of lights and/or sounds, the device reminds users to turn off the water flowing through the faucet or other plumbing fixture. The device reminds the user not only that the water is on (flowing), but also that the plumbing appliance should be turned off to conserve and reduce consumption and to waste less water.

SUMMARY OF THE INVENTION

The present invention alerts users to the presence of conductive materials (typically water) as it emanates from household plumbing and/or appliances. Specifically the invention is frequently utilized on sink faucets and showerheads in bathrooms, kitchens, or, more generally, any location, indoor or outdoor, where a point of water delivery is located.

The device indicates to users that a fluid (commonly water) is flowing through the plumbing fixture. The device indicates when the fluid is continuously present by illuminating LEDs (or other indicator) sequentially, signifying that the fluid has been traveling out of the faucet for a set period of time. The challenge faced and the problem solved by using the device: users are often not mindful of the amount and duration of the water flowing untouched (wasted) down a drain. Thus, the device notifies users that the fluid has been running for some period(s) of time and, if they are not actively utilizing the fluid, to consider turning it off in an effort to conserve said fluid.

The device solves the following problems: using more water than is necessary to accomplish common tasks around the home; efficiently indicating how long the faucet has been on; helping to solve forgetfulness because when users see an orange or red light illuminating on the device, or when users hear an audible sound or sounds, users realize that the water is still running; introducing the opportunity to learn new habits that save water and money on water bills; and providing a more cost-effective, low-power solution as compared to any similar device that relies on the use of a microprocessor due to the paucity of electrical components and low power consumption.

DETAILED DESCRIPTION

The invention described herein reminds users about the flow of water through common plumbing fixtures, and aims to reduce water consumption by alerting users to the flow of water through the plumbing fixture. The invention does this by conveying to users that some predetermined amount of time has passed since the water was turned on. The device communicates to users that water is flowing and to consider turning the faucet off in an effort to conserve this essential natural resource.

In fact, a significant aspect of the device's effectiveness is the ability to teach users to save water, and therefore, even when the device or similar alerting system is not present on a faucet, users continue to practice the water-conserving habits they learned while using the device, resulting in both reduced water usage (consumption) and reduced water waste in households, businesses, and public facilities everywhere.

FIGS. 1A-1D

FIGS. 1A-1D show one possible example of such a device and invention. This embodiment has several key features that allow it to function according to design. The example device comprises a housing (101), a fluid flow sensor (104), a timer, and a signaling device. The housing (101) is used to house the various components, protect them from water, and facilitate attachment to the plumbing (e.g., faucet, shower head, hose or the like). Components need not be fully contained within the housing.

The fluid flow sensor is adapted to detect a flow of fluid. As will be described below, there are any number of fluid flow sensors which may be utilized, and it should be understood that the invention is not limited to any particular fluid flow sensor.

In this example the timer (circuitry in FIG. 10) receives a start signal from the fluid flow sensor when the fluid flow sensor detects the onset of fluid flow, and the timer receives a stop and reset signal from the fluid flow sensor (104) when the fluid flow sensor detects the end of fluid flow.

A signaling device is operably connected to the timer such that the signaling device is actuated when the timer indicates that a predetermined amount of time has elapsed.

Generally, the device has a housing, which in the drawings is shown as a two-piece construction (101 and 102), to protect the internal electronics from water or other environmental influences. The invention is not limited to a two-piece construction. One of ordinary skill in the art will appreciate that the housing may be manufactured in any number of pieces to facilitate ease of manufacturing. The top housing (101) and a bottom housing (102) form one example of a design enclosure. The housings 101 and 102 may attach together with standard fastening elements, such as a lip and groove, screw and boss, and/or snap hook and groove.

Additional materials, such as glue, resin, plastic, rubber, O-ring(s), or other fastening features or technologies (e.g., ultrasonic welding), may be incorporated into device design and production to ensure that no fluid (water) enters the inner compartment of the housing. Fluid intrusion would likely compromise and harm (short circuit) the electronics.

The fluid sensing device includes an attachment mechanism coupled to the housing and adapted to mount to a faucet or the like. The attachment mechanism facilitates attachment to diverse faucet designs. The basic device design is intended to expedite connection to the most common protruding parts of household faucets. Faucets frequently possess protruding parts known as "bubblers," "aerators," or "flow restrictors," but may also include purely decorative additions to faucet hardware. Many such protruding parts thread onto faucets, and often the diameter of the threads (and part) is less than one inch. The housing includes an aperture, opening or through hole (103) extending from a top surface to the bottom surface. The aperture is greater than 0.1 inches and less than 6 inches in diameter, commonly more than 0.5" and less than 2", and typically about 1" in diameter. Though not explicitly shown in FIGS. 1A-1D, one or both ends of the aperture in the housing include threads adapted to engage corresponding threads on faucets, either in addition to or in place of existing hardware. An additional method for attaching to faucets is using a strap. In such a situation, the strap would attach to the body of the faucet, most commonly near the point of delivery, and would hold the device onto the faucet at the point of delivery.

The fluid sensing device may additionally incorporate at least one of bubbler, aerator, and flow restrictor.

The fluid sensing device may optionally include a flow-reducing device. In some embodiments, the flow-reducing device is utilized also as the fluid flow sensor.

Figure 2:
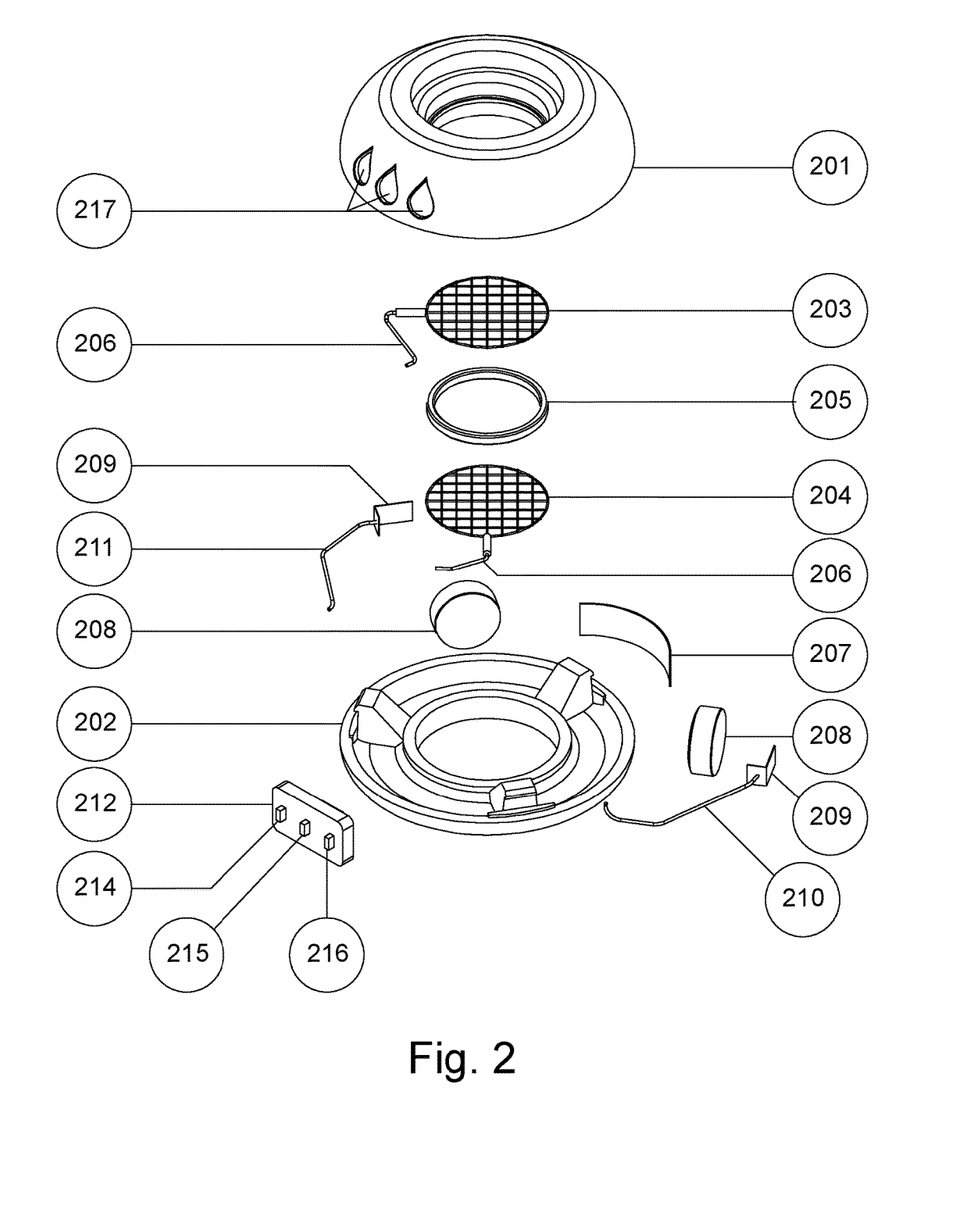
FIG. 2 depicts an exploded view of the device, showing example internal components.

The use of electricity conducting sensors (104) is one method for determining if water is present. In this instance, when water is present (when the faucet has been turned on), the water serves as a conductive bridge between the two sensor screens (FIGS. 2, 203 and 204).

In some embodiments, the fluid flow sensor detects fluid flow due to the electrical conductivity of the fluid. When a conductive bridge has been created, a transistor allows current to flow through the circuitry responsible for activating the fluid indicator(s) (FIG. 2, 214-216).

One type of flow indicator is a light-emitting diode (LED) (FIG. 2, 214) that is in fluid communication with the electronics, and upon current flow through the main circuitry, the LEDs turn on and emit light. Light, as the flow indicator, shines through the housing material (or similar material to allow light transmission) to inform the user that fluid is flowing (an "on indicator"). Following continuous fluid presence (usually flowing), an additional light or lights turn on to indicate that a particular duration of time has passed. A majority of light from the LEDs is emitted through the recessed indicator areas of the housing (105, 106, and 110).

An alternative "flow indicator" might be a sound, generated by the internal electrical circuitry and associated hardware (speaker). In another instance, the indicator could be a seven-segment display, whereby what is communicated to the user is the amount of time the water has been turned on.

In some embodiments, the signaling device may include a numeric display showing elapsed time counted by the timer. The numeric display may replace the LEDs or may be in addition to the LEDs. Moreover, an audible alert may be used with the numeric display or the aforementioned LEDs.

Figures 1A, 1B:
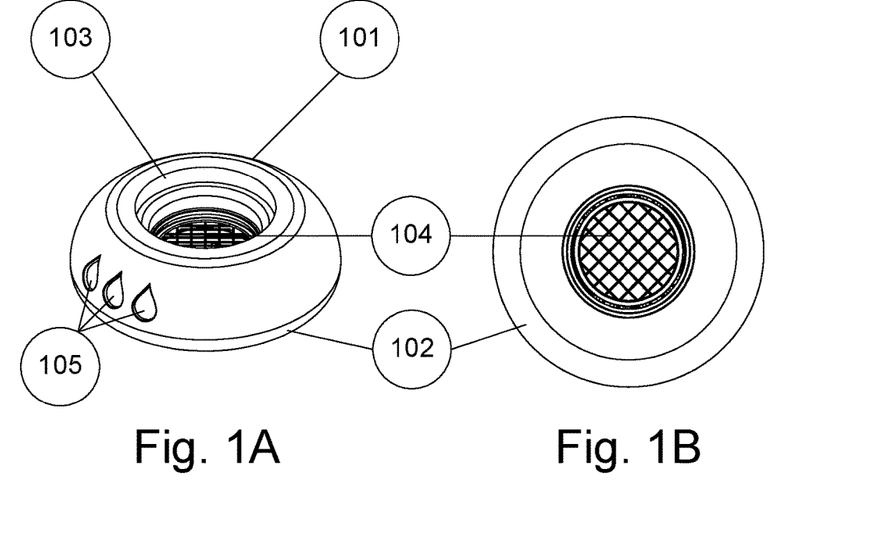
FIGS. 1A-1D show several exemplary views of the intact device.
Figures 1C, 1D:
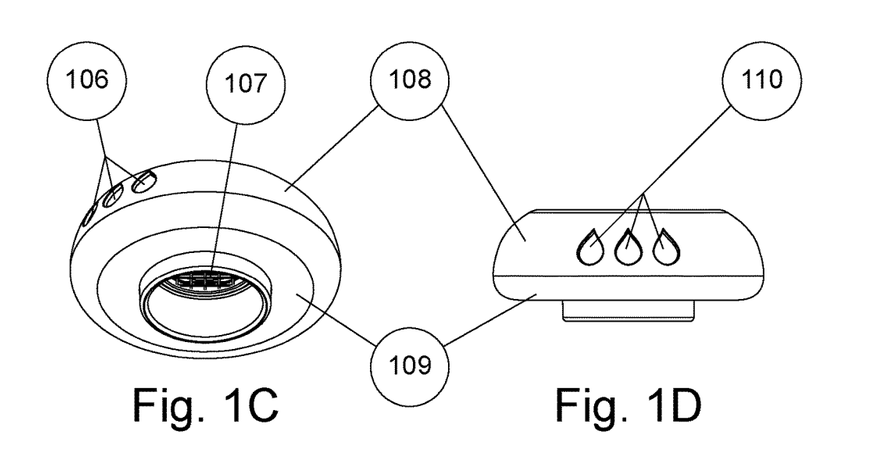

FIGS. 1C and 1D identify many of the same features as illustrated in FIGS. 1A and 1B: 106 and 110 refer to the areas where LED illumination, in this variation of the device, is concentrated and easily viewable by the user; 107 identifies the electrically conductive sensor screen(s); 108 and 109 identify the top and bottom parts of the housing, respectively.

FIG. 2

FIG. 2 shows an exploded view of one possible example of the invention. The top half of the housing is shown (201) and the bottom part of the housing is shown in (202). In this embodiment, the fluid flow sensor includes at least one of a plurality of wires, screens, and conductive surfaces. FIG. 2 components 203 (upper) and 204 (lower) represent an exemplary fluid sensor (conductive screens) separated by a hydrophobic spacer (205). Component 205 (hydrophobic spacer) serves to reduce the probability that any conductive material or fluid (typically water) remains in fluid communication with the two sensor electrodes when the fluid stops flowing (when the faucet valves have been turned off), and therefore prevents short circuiting, continued operation (activation of LEDs, sounds, or time lapse on the timer), and continued draining of the power supply resources. The sensor electrodes are connected to electrode wires (206), which terminate on the PCB (212). A separate electrode (207) connects opposite poles of the batteries (208).

The fluid sensing device may include a battery operably connected to at least one of the timer and the fluid flow sensor. In the depicted version of the device, two 1.5 v (volt) batteries are connected in series to produce a total of 3 v for the device. The current configuration of the electronics is designed to operate using 3 v, but could be operated with alternative voltage (1.5 v to 240 v), typically in the range of 2.5 v to 12 v and often 3 v. Connected to the battery terminals are terminal connectors (209), that are in fluid communication with the positive (210) and negative (211) power leads. The power leads course from where the batteries are located to where the flow indicators display information to the user, where they connect to the PCB, and where they provide the electrical components (PCB, data storage chip, external communication module) with requisite power. Closing of the circuit (current flowing between the two sensor electrodes) causes the power light to become illuminated (214).

In another embodiment, a voltage generator is used in place of batteries. The voltage generator is actuated by fluid flowing through the housing, wherein at least one of the timer and the fluid flow sensor are powered by the voltage generator.

In other instances of the invention, the flow sensor is a fluid pressure sensor. In additional instances, the flow sensor may be one of an infrared sensor, an ultrasonic sensor, a motion sensor, and a sound sensor.

In one instance of the invention, the power light is activated immediately upon current flow across the sensors. The power light has been designated to be green, but in other variations, the light could be blue or white, for example. In another variation of the device, there may be multiple indicators to turn the water off, including visual and auditory signals. In some embodiments, a well-understood color scheme—a traffic light pattern (green, orange, red)—is used to signal fluid flow, whereby the first LED to come on is a green color, representing power on (fluid flowing).

In some embodiments, the visual signaling device includes three LEDs, the visual signaling device illuminating a first LED after an elapsed time counted by the timer exceeds a first threshold, the visual signaling device illuminating second and third LED's after the elapsed time counted by the timer exceeds a second and third threshold, respectively. If fluid remains in the fluid stream and enables current flow across the two sensor electrodes (in one embodiment of the device) for an initial amount of time, then a second light illuminates, which in the current variation of the device is orange. The second LED (orange) warns the user that the faucet has been on for a set duration of time, as determined by the specific electronic components utilized in the device's circuitry. The second LED operates according to the timing as set forth in the electrical circuitry (explained in more detail below). The third LED (red) turns on a set time period after the second (orange) LED. The red LED signals that the water (conductive fluid) has been on (flowing) continuously, and reminds the user to check to see if the fluid should remain flowing. In this variation of the device, the LEDs shape user behavior by drawing attention that water may be flowing when no water flow is needed. Thus, by reminding the user to turn off the water when it is not needed, the device reduces water consumption, reduces water waste, reduces the amount of water needing to be treated by sewage treatment facilities, and increases the upstream supply of fresh drinking water. In this variation of the device, the third light is intentionally colored red, although other colors are also possible. The red light is psychologically informative because of the widespread association of the color red with the meaning "stop." Common examples include, but are not limited to, stop signs and traffic lights.

Figure 10:
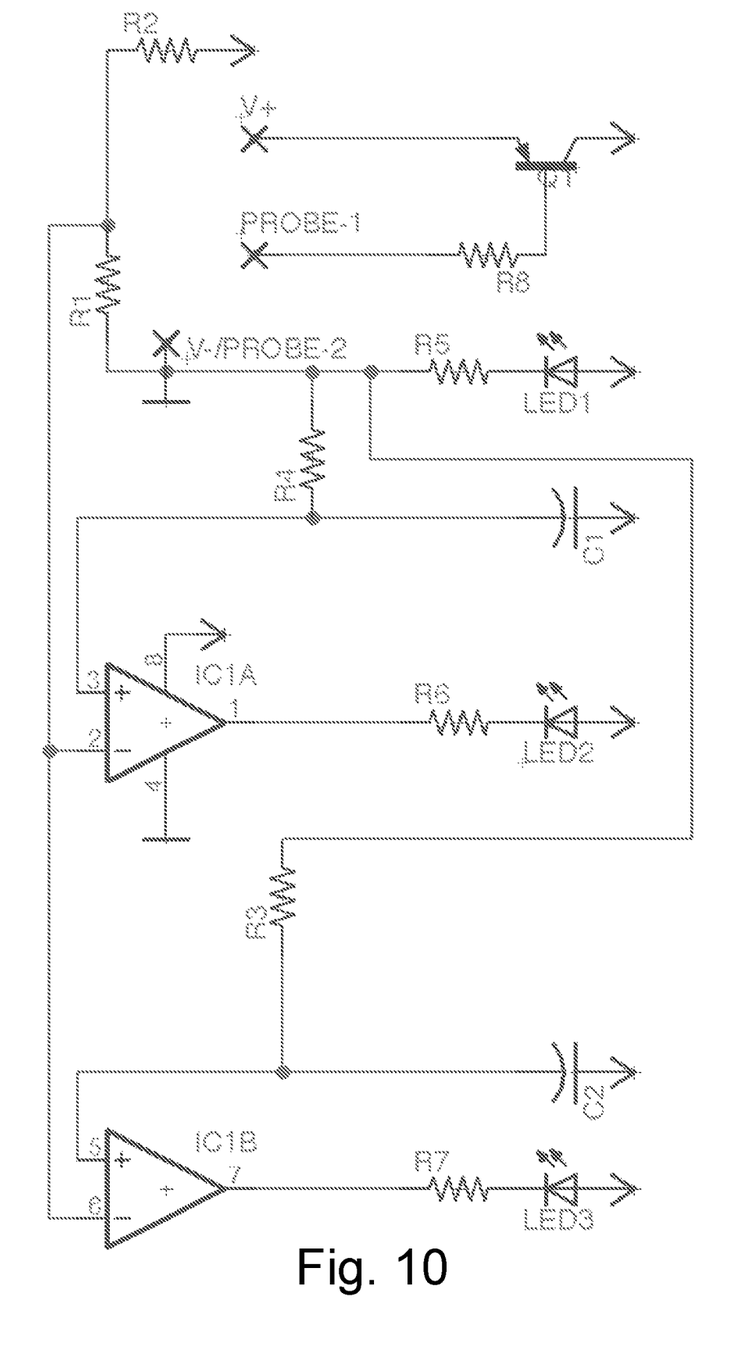
FIG. 10 shows a schematic of the electrical components of a typical device.

Timing of the LED activation has been evaluated. A wide range of possible LED timings is possible using relatively simple resistor and capacitor combinations in the electronic circuitry. Timing from 1 second to 10 minutes is possible, with 3 seconds to 3 minutes being the norm, and 5 seconds and 2 minutes often being used for common timing on household plumbing devices. Similar timing has been used effectively at public restroom facilities, as well as analogous business and office uses (restrooms, kitchen facilities, break rooms, laboratory sinks, and similar plumbing fixtures). For the household bathroom sink, the green light illuminates as soon as the water (conductive fluid) begins flowing. Five seconds after the green LED illuminates, the orange LED comes on, and 10 seconds after the orange LED illuminates, the red LED comes on. In the current circuitry design (one example of a circuit is shown in FIG. 10), all LEDs remain illuminated for as long as the conductive substance allows for current to flow across the sensor probes.

Alternatives to the green-orange-red traffic light configuration are also effective. Devices possessing LEDs of the same color has a similar psychological effect on users, as it is easily interpreted by users that additional lights indicates a longer duration of activity. In this case, the color of the light does not play an essential role in the understanding of the device.

Furthermore, an additive or alternative to the LED indicators (214-216) is a speaker that creates an alert sound or sounds, or a timer display indicating elapsed time since the faucet was last off. The signaling device generates an audible sound. In one embodiment, the volume of the audible sounds increases after an elapsed time counted by the timer exceeds first, second and third thresholds, respectively.

Alternatively, the audible sound may comprise a beep. In the case of beeping, one example of a protocol for the sounds might be one beep for turning on the water, two beeps for leaving the water running for 5 seconds, and three beeps for leaving the water running for 15 seconds. However, the beeping sounds may mimic the description above for light timing, in which the beeps may occur seconds to minutes after turning the faucet on. Furthermore, beeps may not occur with turning on the water, and may only occur at subsequent times, indicating warnings related to continued water use.

Finally, the device may contain a combination of indicators. The signaling device may be one or more of a visual signaling device and an audible signaling device. In such a variation, LEDs may become illuminated and sounds may be created, both of which have the ability to independently communicate with the user. When used in combination, the device may be even more effective, for a greater number of individuals, at signaling information to the user.

Figure 3A:
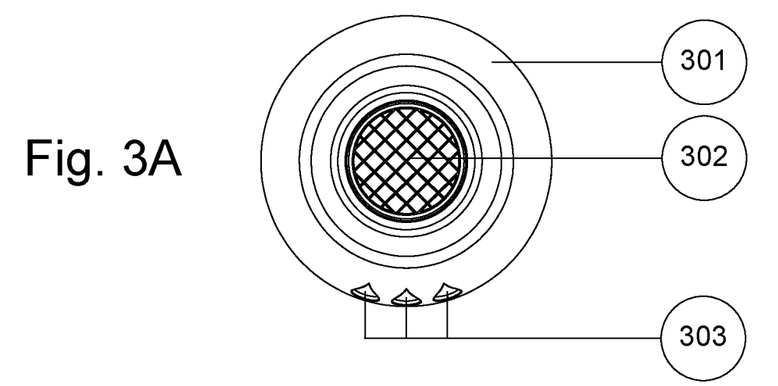
FIGS. 3A-3C show several images of the assembled device without a bottom cover.
Figure 3B:
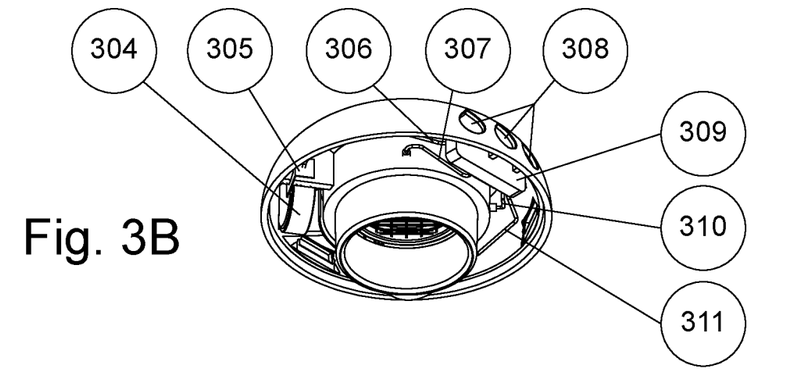
Figure 3C:
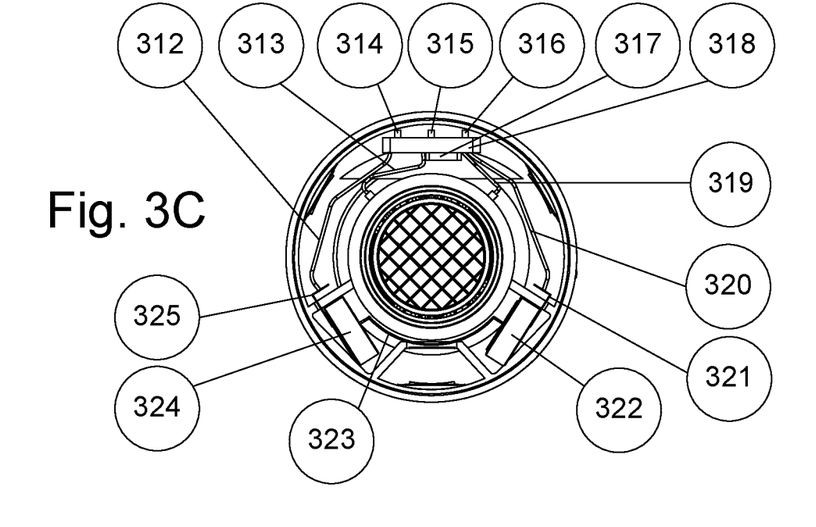

FIGS. 3A-3C

FIGS. 3A-3C show an unexploded view of the device with all components except for the bottom enclosure housing. FIG. 3A shows a top view of the device, FIG. 3B shows an isometric underside view of the top housing with internal components in place, and FIG. 3C shows a true bottom (underside) view, also with all internal components in place. The top housing (301) holds the sensor electrode(s) in their designed positions and orientations, and the three LED indicator areas are oriented on the front of the device (303).

The isometric view (FIG. 3B) without the bottom housing allows viewing of the internal components of the device. One battery is visible (304), and the battery terminal (305) that makes contact with one pole of the battery is connected via the wire (306) to the installed PCB (309). One sensor electrode wire (307) is clearly visible and connects directly to the PCB as well. The indicators areas (308) in the top housing are visible, as is the second sensor electrode wire (310) and the other battery electrode wire (311).

The bottom view (FIG. 3C) is useful in order to indicate the proper positioning of components in the top housing. Most all of the aforementioned components are visible in the bottom view. The battery electrode wire (312) connects directly to the PCB (318). One sensor electrode wire (313) is also visible. In this version of the device, there are three LEDs present: a green (314), an orange (315), and a red (316). A major benefit of the electrical component design is the inclusion of only a single surface-mounted integrated circuit (317). The efficiency in design allows for meaningful cost savings when manufacturing the device. The PCB (318) rests in the front part of the top housing, immediately behind the 3 spots (303) where light shines through and informs the user of their water use habits. The second sensor wire (319) attaches directly to the PCB (318), as does the second battery wire (320). The battery connector (321) connects the wire to the battery (322). An electrode (323) connects the two batteries in series, resulting in 3 v for the device (1.5 v for each battery). The second battery (324) and the second connector (325) are additional circuitry components and connect to the PCB via the requisite wire (312).

Figure 4A:
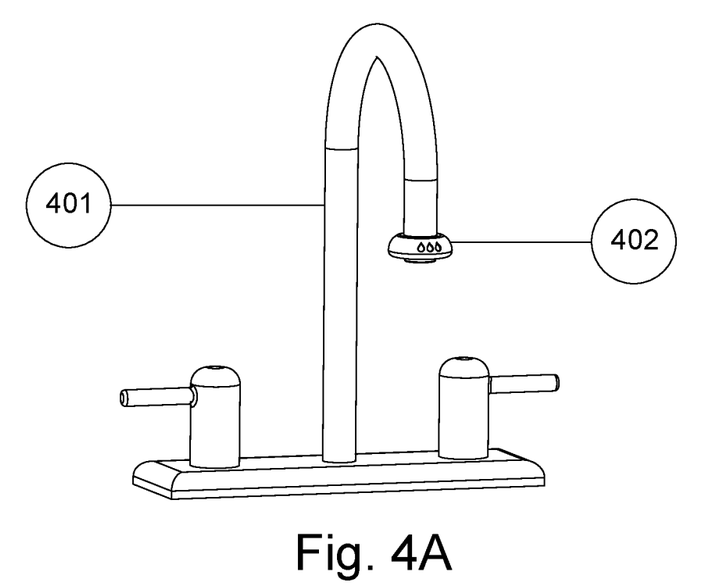
FIGS. 4A-4B show the typical use of the device on a faucet at the point of use.
Figure 4B:
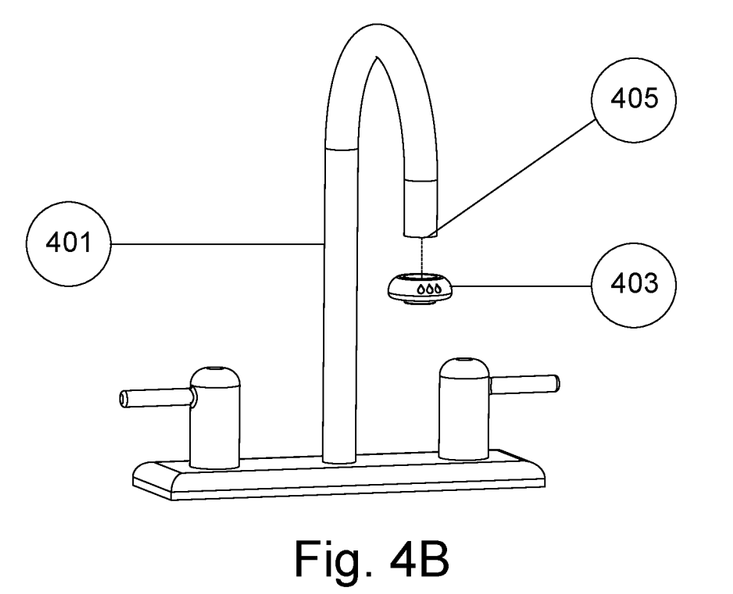

FIGS. 4A-4B

FIGS. 4A-4B illustrate the addition of the device to faucets. The device (402) is added to a faucet (401) at the point where the water escapes the faucet (FIG. 4A). The device has all necessary components to function immediately upon connection to the faucet. FIG. 4B is an exploded view of the device (403) separated from the faucet (401), showing how it is attached at the point where the water escapes the faucet (405).

Figure 5:
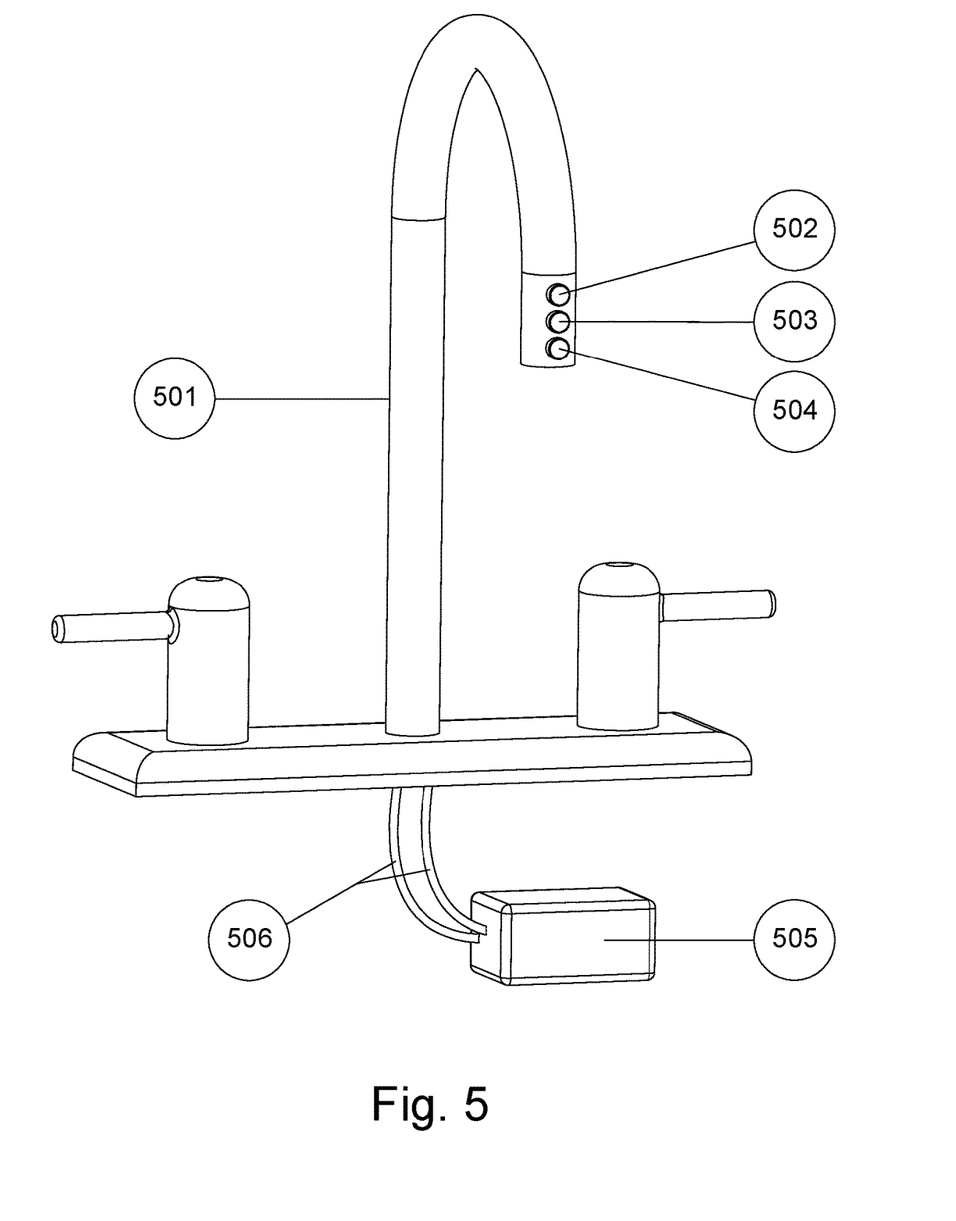
FIG. 5 depicts the incorporation of the device's principal technologies into the body (or neck) of a faucet.

FIG. 5

FIG. 5 illustrates the incorporation of the invention's technology into a faucet (501). The electronics and power are contained in a housing (505) that is located below the faucet and connects to the flow indicators via wires (506) incorporated into the faucet body. The flow indicators, in this variation, are a set of three lights: red (502), orange (503), and green (504). Similar to the functionality described in detail in FIGS. 1A-1D, FIG. 2, and FIGS. 3A-3C, the green LED (504) comes on when water begins to flow, the orange (503) illuminates after 5 continuous seconds of water flow, and the red (502) illuminates 15 seconds after continuous water flow, in one variation of the invention. The timing of the LED illumination may vary widely, as may the number and pattern of LEDs. These variations may depend on the specific use and purpose of the device, as previously described. Furthermore, other indicators may be used by themselves or in combination with the LEDs and may include a timer or sounds at various times after the faucet is turned on.

Figure 6A:
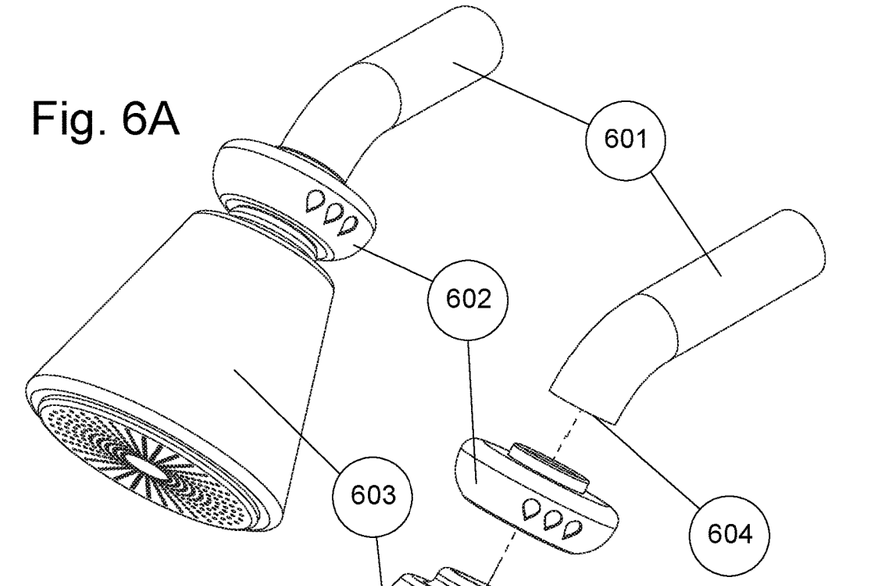
FIGS. 6A-6B show how the device can be used between shower plumbing and a showerhead.
Figure 6B:
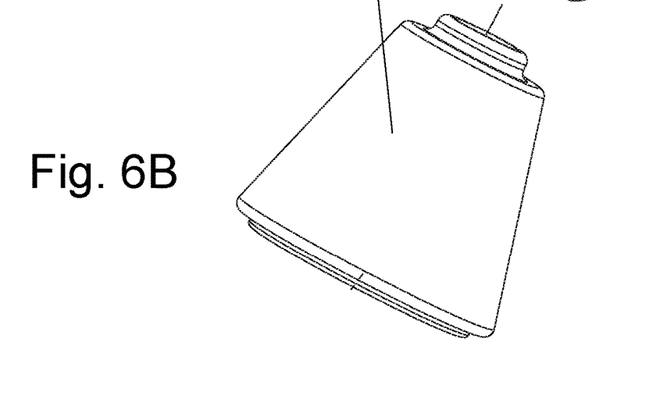

FIGS. 6A-6B

FIGS. 6A-6B illustrate the use of the device in a shower. In this embodiment, the housing of the fluid sensing device is an intermediary device between two pieces of plumbing hardware. The fluid sensing device includes an attachment mechanism coupled to the housing, one portion of the attachment mechanism is adapted to mount to a showerhead and another portion of the attachment mechanism is adapted to couple to the water pipe or point of delivery plumbing pipe (601). The shower's point of delivery plumbing pipe (601) comes out of the wall (not shown) and commonly has threads (not shown) on the end of the tubing (604) to which a showerhead commonly attaches. In the current design, shown in FIG. 6A, the device (602) attaches directly between the pipe (601) and the showerhead (603), although other configurations are feasible. FIG. 6B illustrates an exploded view of the pipe (601), the device (602), and the showerhead (603) at a slightly different angle, in order to clearly show how the device could be situated in between the two standard shower fixtures. Also shown is a switch (605) integrated into the device enabling the user to modulate device functionality (e.g., turn on, turn off, adjust timing of flow indicator(s)).

Figure 7A:
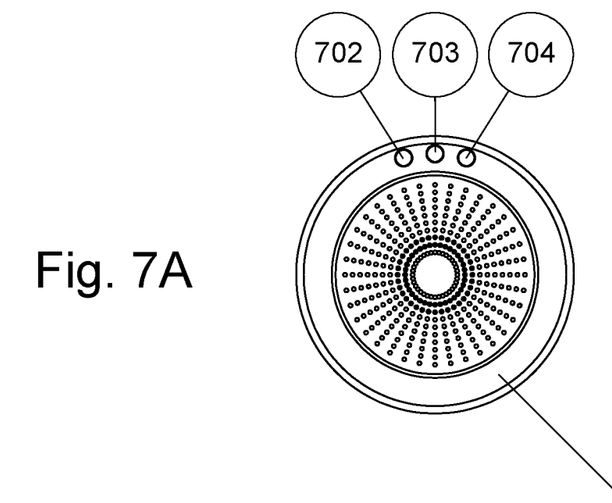
FIGS. 7A-7B show a showerhead with the device incorporated therein.
Figure 7B:
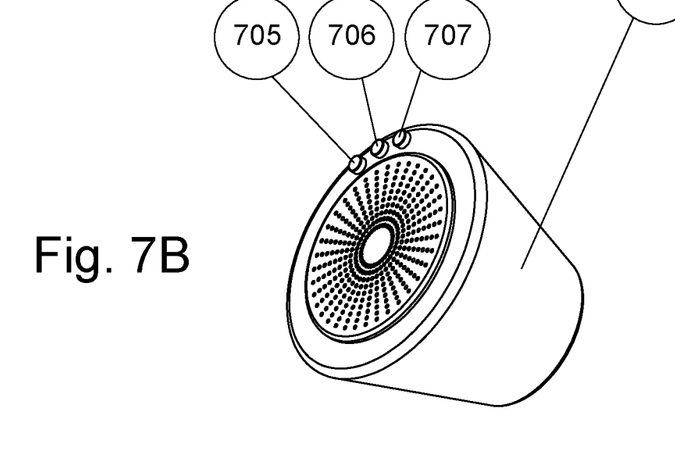

FIGS. 7A-7B

FIGS. 7A-7B illustrate the incorporation of the underlying technology of this device into a showerhead (701). FIG. 7A shows a front view of a showerhead with 3 fluid indicators incorporated into the front of a showerhead. In this variation, the three indicators are three differently colored LEDs that function as described previously. However, for use in a shower, a longer delay in LED illumination may be required. The timing might vary between 0 seconds and 1 hour, typically between 30 seconds and 15 minutes, and in this variation: a green LED (702) turns on when water begins to flow, an orange LED (703) illuminates after 5 minutes of continuous water use, and a red LED (704) turns on 10 minutes after water is turned on and remains on continuously. FIG. 7B shows the same showerhead from a different angle. Even from this angle, the green (705), the orange (706), and the red (707) LEDs are observable by the user.

Figure 8A:
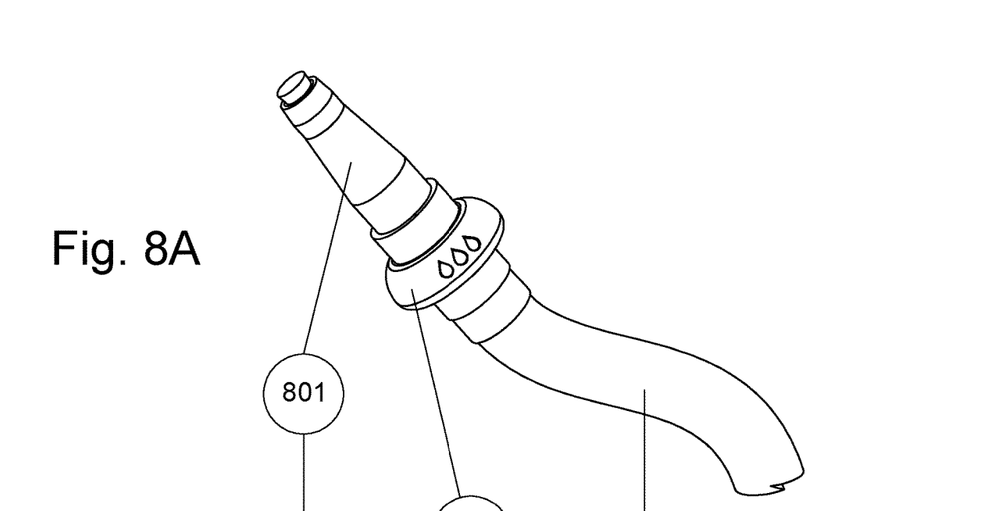
FIGS. 8A-8B illustrate how the device may be used outside the home on a garden hose.
Figure 8B:
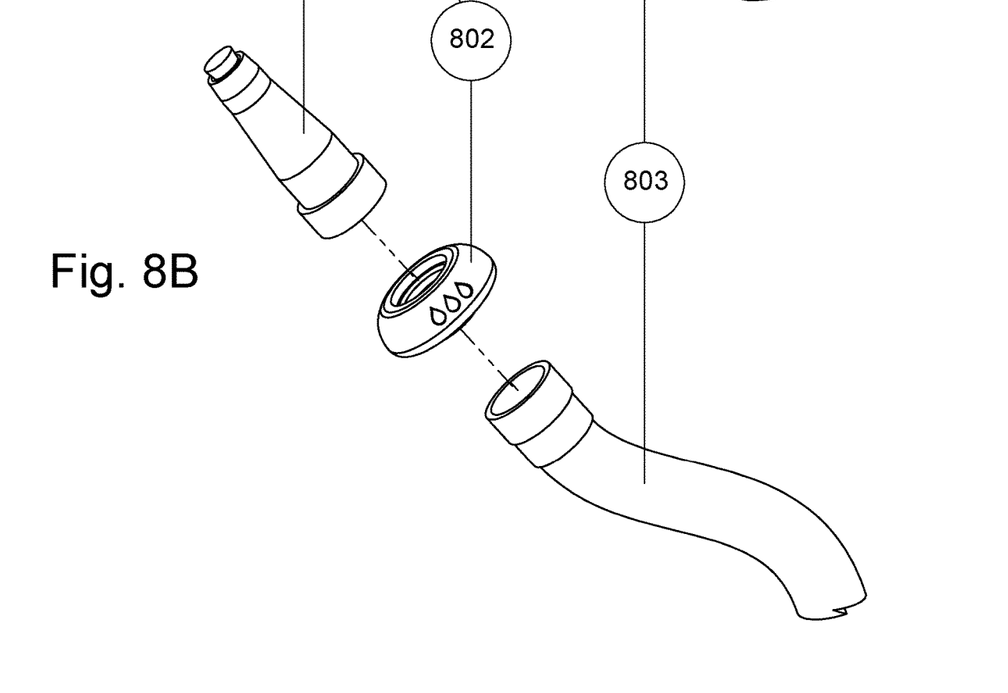

FIGS. 8A-8B

FIGS. 8A-8B illustrate the device (802) used in a similar way as shown above in the shower (FIGS. 7A-7B), but in this variation, the device (802) is attached onto the end of a garden hose (803), and before a point-of-use nozzle (801). FIG. 8A shows the connected components, whereas FIG. 8B shows the exploded view, clearly demonstrating how the device attaches between the end of the hose and the nozzle. In this example of the device, it may function similarly to the use in the shower, in which the timing is on the order of minutes between indicator light illuminations. Furthermore, as discussed above, LEDs are only one form of indicator to the user, and other forms, such as sound or timers, may also be used. The flow sensing device (802) may also be integrated into a single point-of-use unit (FIG. 8C) adapted to attach to the end of a hose, for example. Such a device would have at least one flow indicator (804), LED lights for example, built into the point-of-use nozzle (801), and in some versions, have a switch (805) on the point-of-use nozzle (801) allowing the user to alter the timing of the timer, which causes the lights to illuminate at several timings, for example.

Figure 9:
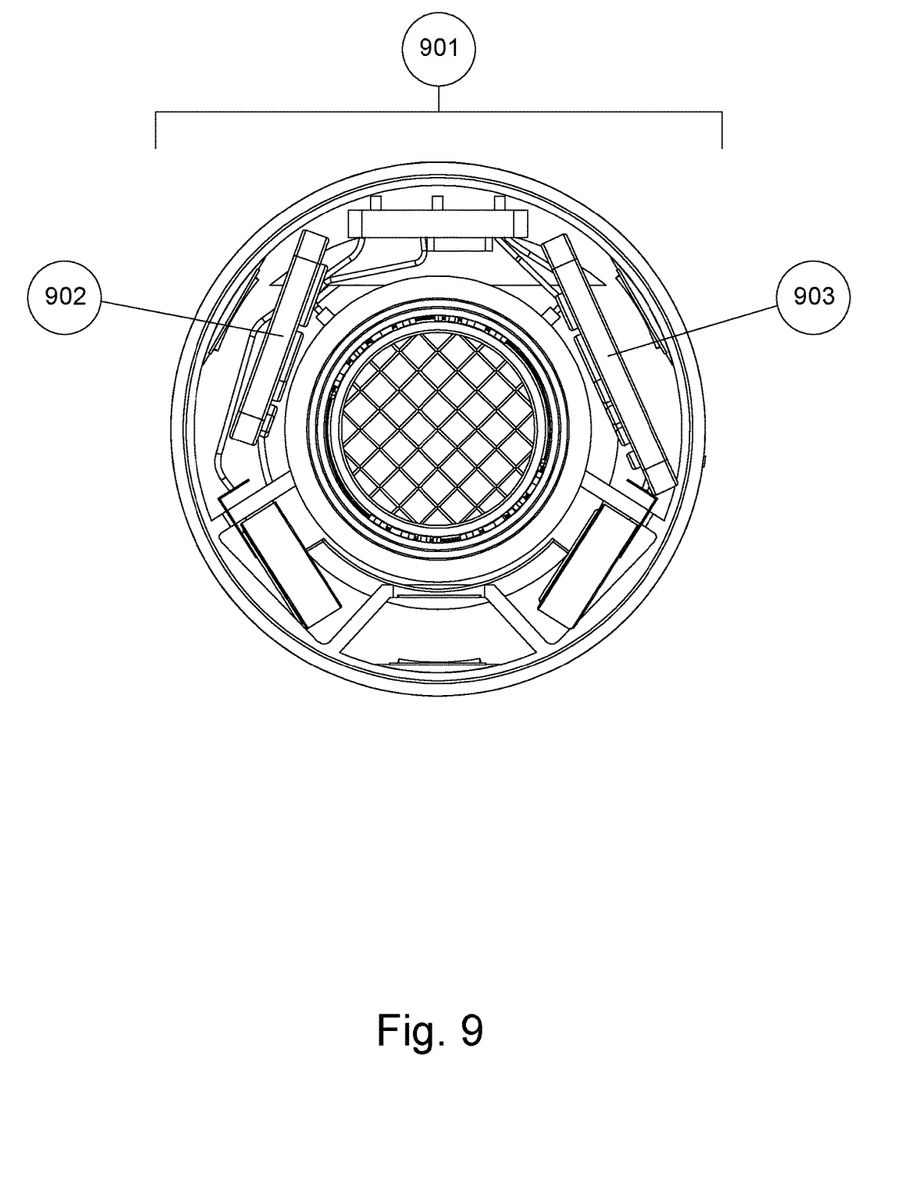
FIG. 9 illustrates the device with added internal hardware for communicating wirelessly with the device.

FIG. 9

The fluid sensing device (901) may also include hardware circuitry for wireless communication and data transfer (to/from the device). The wireless communication system transmitting a unique device identifier and an amount of elapsed time measured by the timer. FIG. 9 illustrates a device that includes additional integrated circuits and circuitry modules for wireless connection (903) to handheld electronic devices such as smartphones and computer tablets, in addition to laptop, desktop computers, or computer networks. The additional hardware may include the ability to store data on the device's memory chip (902), so that as data regarding usage is collected, it can be stored until retrieved from the device by way of wireless, and possibly wired, communication. The wireless communication system (wireless connection) is a wireless local area network (WLAN) based on the Institute of Electrical and Electronics Engineers' (IEEE) 802.11 standards. Additionally or alternatively the wireless communication system is a wireless local area network (WLAN) based on the IEEE 802.15 standards. In some embodiments, the wireless communication system is connected to the Internet. The fluid sensing device (901) shown in FIG. 9 is essentially the same as shown in FIG. 3C, with the exception of the addition of a memory storage board (902) and a wireless communication board (903).

The fluid sensing device of the present invention may include memory for storing an amount of elapsed time measured by the timer.

The data stored in the memory may be remotely accessible over the wireless communication system.

These two components are useful for longitudinal analysis of water use habits as detailed by the fluid sensing device's utilization on fluid flow devices like faucets, showers, hoses, and similar plumbing fixtures.

Finally, the fluid sensing device may have an operably integrated switch for turning the device on, off, and changing the integrated timing of the device. For example, the device's first warning light or sound can be adjusted by a user accessible switch in communication with the internal electronics and mounted on the housing. The switch may control the timing of the fluid sensing device such that the timer results in one or more of the device indicators indicating at between 1 and 1000 seconds, commonly between 5 and 200 seconds, and typically 10-100 seconds following initiation of onset of fluid flow. Exemplary switches are shown on the point-of-use device (805) attached to a garden hose and on the device used in the shower (605), but are not limited to these devices or uses.

The fluid sensing device may include a switch coupled to the housing, the switch enabling users to perform one or more of the following functions of turning the device off, turning the device on, and altering the timing of the one or more fluid flow indicators. Additionally or alternatively, the switching functions may be performed on a computer or other device capable of connecting wirelessly over the wireless communication system (internet).

FIG. 10

FIG. 10 illustrates one example of the circuitry that may be used to detect water flow by way of electrically coupled sensors (1001) and a transistor (1002), and then to indicate to the user that the faucet has been turned on (one variation may be a green LED (1003) turning on). Moreover, continued water use results in a second indicator (1004) turning on (one variation may be an orange LED), and then a third LED (1005) may turn on if water continues to flow for a predetermined time beyond that (one variation may be a red LED). At a minimum, the circuitry can be considered quite simple, requires very low energy, includes only one (but may include additional) integrated circuits (1006), has a very small footprint in terms of required circuit board area, and is inexpensively manufactured. The indicators (1003-1005) may also be operably connected to a speaker that produces a sound that alerts the user to at least one of the presence and duration of water flow.

VARIATIONS ON THE TECHNOLOGY

The device has been tested in numerous environments, under variable conditions, and with diverse component configurations. The device's inventors recognize that there are several distinct variations (including power supply solutions, fluid recognition components, indicators, connectivity options, and applications) that are easily adaptable from the device's current design. The list below describes the multitude of variations that are possible with the device, many of which have been tested using various combinations of components (and technologies) for diverse purposes.

In terms of the power supply: the device may be powered by one 3 v battery, two 1.5 v batteries, or similar. One instance may be a 12 v battery; another version may incorporate a 9 v battery; the device may be powered by the water pressure (hydro powered voltage generator); the device may be powered by a transformer connected to alternating current provided in standard household outlets; the device may be plugged into the wall outlet directly (commonly 120 v or 240 v); the device may be powered by connecting to existing powered devices; and the power supply may be incorporated into the device itself, obviating the need for any external wires or connectivity altogether.

In terms of connecting to plumbing fixtures: the device may use threads to attach to the faucet, which is a typical method for attaching aerators, bubblers, cosmetic parts, and flow restrictors onto faucets; the existing part can be removed and replaced with the device; the device may also utilize an adapter ring(s) to attach to faucet hardware; and the device can be connected to non-round, unusually shaped, or large plumbing fixtures by utilization of a strap with flexible chords to maintain efficient communication with the faucet's point of delivery.

In terms of sensors, they can be any of the following: individual wires; multiple wires; multiple groups of wires; metallic screens; pressure sensors; infrared sensors; a piezoelectric sensor; and anything that conducts electricity when water flows across it/them.

In terms of flow indicators: flow indicators provide some sort of signal to users of the plumbing that a fluid is flowing; flow indicators may be colored LEDs that light sequentially, according to timing determined by the electrical components (typically such components are located on the printed circuit board, but this is not a requirement); flow indicators may also be a 7 segment display (such indicators can display a variety of digits on a display, and in this instance, may serve to display the amount of time the water has been flowing through the fixture); and flow indicators may include a sound producing device (examples would be a beep(s), tone(s), song, or any audible sound at specified times to indicate how long the fluid (water) has been flowing).

In terms of locations of use for the fluid sensing device, they may be useful for kitchens, bathrooms, laundry rooms, utility rooms, and other water supply locations inside and outside the home and business. Specifically, the fluid sensing device can be used on indoor faucets, outdoor faucets, showers, baths, wash basins, hose connections, irrigation use, and any location with a faucet, spigot, or other water supply source.

In terms of the shape of the fluid sensing device: the device's shape is optimized to provide a rapid and intuitive signal that the water is running and placed to optimize visual detection, commonly near the point of use; the device has a low profile so as not to protrude into the workspace below the plumbing hardware; the device is small enough to be attractive and blend in with existing plumbing hardware; and water drains off the surfaces of the device easily to prevent collection.

Key aspects of the current invention and identification of alternative device components are indicated herein. The circuitry avoids the need for or use of a microprocessor. The traffic-light-inspired LED notification system is inherently intuitive. The use of LEDs to reduce water consumption (and waste) is clear. The use of conductivity of fluid between probes to start current flow within a circuit. The use of a single or multiple integrated circuit(s) (IC) is simple, reproducible, and minimizes cost during manufacturing, enabling volume pricing for mass production savings, representing a significant difference from prior art and is a patent-worthy distinction. The use of a combination of single/multiple IC(s) with various-size resistors and capacitors allows for efficiency in function. Affordability provides a competitive advantage. The use of a probe in the center of the water stream (as opposed to a screen that covers the entire cross-sectional area of the center of the device where fluid flows) may be used in combination with an electrode located near the inner surface of the through hole (where water flows in a shower head). Allows for signaling only when the tubing is at least half full of water (or other electrically conductive fluid). Generally this occurs only when the plumbing fixture has been turned on, due to the drainage of the fluid soon after turning off the fixture(s). This is likely to be useful for showerheads, for example. The use of two screens as probes, separated by some distance, which is traversed by flowing water and initiates current flow. The potential wireless connection capability utilizing at least one of radio frequency transmitters, Bluetooth, WiFi, and any future communication or data transfer system. Integration with the Internet via wireless connections. Development of software applications for smartphones, tablets, smart watches, laptop and desktop computers, etc., to monitor usage hour to hour, day to day, month to month, year to year, etc. The device can incorporate a water-restriction device to reduce water flow. The device can have one or more screens or filters. Said screens can be used as electrodes. The device may contain components or aerators and may utilize said components for fluid conductivity (for electrodes). Timing of light activation can be easily controlled by altering surface mount electronic components on the printed circuit board. There could be a power switch to turn the device on and off. On occasion, there may be a reason to turn the device on or off without wanting to remove it from the plumbing fixture.

In terms of integration into plumbing fixtures, the flow sensing device technology can be integrated into commercial plumbing hardware. An example is integration into faucets: at the point of delivery, on the top, sides, front, or anywhere visible to the user; or at the base of the faucet assembly. The invention may be incorporated into showers: on the hardware where the faucet handle(s) is located; on the neck of the shower; on the showerhead; and/or mounted on the wall. More specifically in terms of the showerheads, the visual flow indicators may be present on the edge of the showerhead, on the face, on the bottom, and/or on the sides.

There are numerous configurations (combinatorial configurations) for the fluid flow sensing device: there are multiple components that go into creating this device, and various combinations of components may be utilized in several different versions. In terms of sensors, there may be at least one of wires, pressure sensor, infrared sensor, and piezoelectric. In terms of flow indicators, there may be at least one of an LED of one color, LEDs of more than one color, a 7 segment display, and sound/tones (beep). In terms of power, there may be at least one battery, electricity (alternating current), another device, and hydroelectric. In terms of fluid flow indication, there may be one of at least sequential indication of lights (green, orange, and red, at different times) and sequential or repetitive progression of sounds/tones. In terms of location of use, the fluid sensing device may be used on at least one of the bathroom faucet, kitchen faucet, showerhead, bathtub faucet, shower faucet, wash basin, and any other location with faucet. In terms of integration into plumbing hardware, the fluid sensing device may be incorporated into commercially produced plumbing fixtures, and may be used as standalone attachments for existing plumbing fixtures. In terms of connectivity and data use, the fluid sensing device may use at least one of WiFi, Bluetooth, or other connectivity allowing for data collection, transfer and analysis on smartphone, smartwatch, tablet, and computer.

What is claimed is:

1. A fluid sensing device, comprising:
   a housing;
   a fluid flow sensor at least partially contained within the housing and adapted to detect a flow of fluid through the housing and adapted as a flow-reducing device;
   a timer operably connected to the fluid flow sensor and at least partially contained within the housing, the timer receiving a start signal from the fluid flow sensor when the fluid flow sensor detects the onset of fluid flow, the timer receiving a stop and reset signal from the fluid flow sensor when the fluid flow sensor detects the end of fluid flow; and
   at least one signaling device operably connected to the timer such that the signaling device is actuated when the timer indicates that a predetermined amount of time has elapsed.

2. The fluid sensing device of claim 1, further comprising an attachment mechanism coupled to the housing, the attachment mechanism adapted to mount to a faucet.

3. The fluid sensing device of claim 1, further comprising an attachment mechanism coupled to the housing, the attachment mechanism adapted to mount to a showerhead.

4. The fluid sensing device of claim 1, wherein the fluid flow sensor detects fluid flow due to the electrical conductivity of the fluid.

5. The fluid sensing device of claim 4, wherein the fluid flow sensor comprises at least one of a plurality of wires, screens, and conductive surfaces.

6. The fluid sensing device of claim 1, wherein the signaling device is one or more of a visual signaling device and an audible signaling device.

7. The fluid sensing device of claim 6, where the visual signaling device includes one or more LEDs.

8. The fluid sensing device of claim 7, wherein the visual signaling device includes three LEDs, the visual signaling device illuminating a first LED after an elapsed time counted by the timer exceeds a first threshold, the visual signaling device illuminating second and third LED's after the elapsed time counted by the timer exceeds a second and third threshold, respectively.

9. The fluid sensing device of claim 1, wherein the signaling device is a numeric display showing elapsed time counted by the timer.

10. The fluid sensing device of claim 1, wherein the fluid flow sensor is a fluid pressure sensor device.

11. The fluid sensing device of claim 1, wherein the fluid flow sensor is an infrared sensor.

12. The fluid sensing device of claim 1, further comprising a battery operably connected to at least one of the timer and the fluid flow sensor.

13. The fluid sensing device of claim 1, further comprising a voltage generator actuated by fluid flowing through the housing, wherein at least one of the timer and the fluid flow sensor are powered by the voltage generator.

14. The fluid sensing device of claim 1, wherein the housing is integrated with one of a faucet, a showerhead and a point-of-use nozzle.

15. The fluid sensing device of claim 1, wherein the signaling device generates an audible sound having a volume and a repetition frequency, at least one of the volume and repetition frequency increases after an elapsed time counted by the timer exceeds first, second and third thresholds, respectively.

16. The fluid sensing device of claim 1, wherein the housing is an intermediary device between two pieces of plumbing hardware.

17. The fluid sensing device of claim 1, wherein the housing is interposed between and interconnects a showerhead and a water pipe.

18. The fluid sensing device of claim 1, wherein the housing attaches to a hose from which fluid is dispensed.

19. The fluid sensing device of claim 1, further comprising a wireless communication system transmitting a unique device identifier and an amount of elapsed time measured by the timer.

20. The fluid sensing device of claim 19, wherein the wireless communication system is a wireless local area network (WLAN) based on the Institute of Electrical and Electronics Engineers' (IEEE) 802.11 standards.

21. The fluid sensing device of claim 19, wherein the wireless communication system is a wireless local area network (WLAN) based on the Institute of Electrical and Electronics Engineers' (IEEE) 802.15 standards.

22. The fluid sensing device of claim 19, wherein the wireless communication system is connected to the Internet.

23. The fluid sensing device of claim 1, further comprising memory for storing an amount of elapsed time measured by the timer.

24. The fluid sensing device of claim 19, further comprising memory for storing an amount of elapsed time measured by the timer, wherein data stored in the memory is remotely accessible over the wireless communication system.

25. The fluid sensing device of claim 1, further comprising a switch coupled to the housing, the switch enabling users to perform one or more of the following functions of turning the device off, turning the device on, and altering the predetermined amount of time.

26. The fluid sensing device of claim 19, wherein the wireless communication system is a wireless personal area network (WPAN) based on the Institute of Electrical and Electronics Engineers' (IEEE) 802.15 standards.

27. The fluid sensing device of claim 19, wherein the wireless communication system further transmits a date and time.

28. A fluid sensing device, comprising:
    a housing;
    a fluid flow sensor at least partially contained within the housing and adapted to detect a flow of fluid through the housing;
    a timer operably connected to the fluid flow sensor and at least partially contained within the housing, the timer receiving a start signal from the fluid flow sensor when the fluid flow sensor detects the onset of fluid flow, the timer receiving a stop and reset signal from the fluid flow sensor when the fluid flow sensor detects the end of fluid flow;
    at least one signaling device operably connected to the timer such that the signaling device is actuated when the timer indicates that a predetermined amount of time has elapsed; and
    a voltage generator actuated by fluid flowing through the housing, wherein at least one of the timer and the fluid flow sensor are powered by the voltage generator.

\* \* \* \* \*